United States Patent
Parrish

(10) Patent No.: US 7,455,280 B2
(45) Date of Patent: Nov. 25, 2008

(54) TUBE ACTIVATED CARTRIDGE/FITTING VALVE

(75) Inventor: Lyle Elon Parrish, Scotts, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 629 days.

(21) Appl. No.: 11/012,476

(22) Filed: Dec. 15, 2004

(65) Prior Publication Data

US 2005/0127114 A1    Jun. 16, 2005

Related U.S. Application Data

(60) Provisional application No. 60/530,098, filed on Dec. 16, 2003.

(51) Int. Cl.
  F16L 37/28  (2006.01)
  B29C 45/14  (2006.01)

(52) U.S. Cl. ............... 251/149.6; 251/149.1; 264/265

(58) Field of Classification Search ............... 141/353, 141/351; 251/149.1, 149.6, 149.7; 264/265; 137/614.03, 614.04
See application file for complete search history.

(56) References Cited

U.S. PATENT DOCUMENTS

| 2,744,770 | A | * | 5/1956 | Davidson et al. ............ 285/316 |
| 2,919,935 | A | | 1/1960 | Nyberg |
| 3,532,101 | A | * | 10/1970 | Snyder, Jr. ................... 137/75 |
| 3,567,175 | A | | 3/1971 | Sciuto, Jr. |
| 4,280,523 | A | | 7/1981 | Norton |
| 4,436,125 | A | * | 3/1984 | Blenkush .................... 141/330 |
| 4,699,356 | A | | 10/1987 | Hargrove et al. |
| 4,768,559 | A | * | 9/1988 | Hehl .......................... 137/887 |
| 4,792,115 | A | * | 12/1988 | Jindra et al. ............. 251/149.6 |
| 5,002,254 | A | | 3/1991 | Belisaire et al. |
| 5,293,902 | A | * | 3/1994 | Lapierie ................ 137/614.04 |
| 5,485,982 | A | * | 1/1996 | Gunderson .............. 251/149.6 |
| 5,607,139 | A | | 3/1997 | Kjellberg |
| 5,683,120 | A | | 11/1997 | Brock et al. |
| 6,089,540 | A | | 7/2000 | Heinrichs et al. |
| 6,174,488 | B1 | * | 1/2001 | Usui et al. .................. 264/511 |
| 6,283,443 | B1 | | 9/2001 | Taneya |
| 6,520,480 | B2 | | 2/2003 | Martin-Cocher et al. |
| 6,543,745 | B1 | * | 4/2003 | Enerson ................... 251/149.7 |
| 6,557,904 | B2 | | 5/2003 | Naito |
| 6,568,717 | B1 | | 5/2003 | Le Clinche |
| 2004/0011983 | A1 | | 1/2004 | Maiville et al. |

FOREIGN PATENT DOCUMENTS

GB        2069083 A    8/1981

\* cited by examiner

*Primary Examiner*—Stephen M. Hepperle
*Assistant Examiner*—Andrew J Rost
(74) *Attorney, Agent, or Firm*—Renner, Otto, Boisselle & Sklar, LLP

(57) ABSTRACT

The present invention provides a releasable tube fitting that provides secure connection of a tube to the fitting while the fitting is under pressure. Further, the present invention provides a fitting that may be used with a more flexible tube than conventional fittings. The fitting of the present invention also provides for connection of a tube to the fitting when the fitting is under higher operational pressure than conventional fittings. A cartridge including the fitting of the present invention is also disclosed.

18 Claims, 3 Drawing Sheets

TUBE ACTIVATED CARTRIDGE/FITTING VALVE

RELATED APPLICATIONS

This application claims the benefit of U.S. Provisional Application No. 60/530,098, filed Dec. 16, 2003.

FIELD OF THE INVENTION

The present invention relates to a self-sealing tube fitting that allows a tube to be connected to and disconnected from the fitting under pressure.

BACKGROUND OF THE INVENTION

Self-sealing tube fittings of various types are known in the art. Such fittings enable circuits and machinery to stay under pressure when being checked and maintained. To make a connection, the end of a tube is inserted into the fitting. As the tube is inserted, the end of the tube pushes against a valve to open the valve and establish fluid communication between the tube and a flow passage in the fitting. Withdrawal of the tube from the fitting is prevented by a collet that grips the tube when the collet is urged outwardly against a cam surface. To remove the tube, the collet is pushed inwardly to release the tube so that it can be withdrawn from the fitting. As the tube is withdrawn, a spring causes the valve to close to prevent the escape of pressurized fluid from the fitting.

In order to satisfy more demanding performance characteristics, some self-sealing fittings could only be used with rigid tubes. If a flexible tube was desired or needed, the prior art solution was to equip the flexible tube with a male fitting for insertion into a female coupling.

SUMMARY OF THE INVENTION

The present invention provides a self-sealing tube fitting that can be used with a flexible tube and still provide performance characteristics that previously necessitated the use of a rigid tube or a male fitting. Consequently, the tube fitting can be used in applications that previously had required the use of mating male and female fittings. One exemplary application is use of the fitting in air and/or cooling lines of a mold, thereby to facilitate mold change. The fitting provides a detachable yet secure connection between the tube and fitting, while enabling the quick connection and quick disconnection of the tube to the fitting even when the fitting is under pressure. As will be appreciated, the fitting can be used with tubes that are more flexible than tubes needed for use with prior art self-sealing fittings, and at higher pressures than a corresponding prior art self-sealing fitting.

Accordingly, the invention provides a self-sealing tube fitting comprising a fitting body; a valve plunger supported in the fitting body for axial movement between open and closed positions; and a releasable tube holder movable between an engaged position and a disengaged position. The plunger has a valve portion and tube support portion extending axially from the valve portion, and the valve portion has a portion thereof projecting transversely beyond the tube support portion to form an abutment. The tube holder surrounds the tube support portion and defines therewith an annular space into which a tube can be inserted and telescoped over the tube support portion for engaging the abutment such that further insertion of the tube into the fitting body effects movement of the plunger from its closed position to its open position.

In a preferred embodiment, the releasable tube holder, when engaged, grips the tube on an outer surface at a region thereof that is supported interiorly by the tube support portion. The valve portion includes a valve and the fitting body includes a valve seat that is engaged by the valve to close a fluid passage in the fitting body, the valve engaging the valve seat to close the fluid passage when the valve plunger is in its closed position and the valve being spaced from the valve seat to open the fluid passage when the valve plunger is in its open position.

The valve seat can have an inner cylindrical surface, an annular seal on the fitting body can be configured to seal against the outside surface of the tube when inserted into the fitting body. The annular seal can be positioned to seal against the outer surface of the tube prior before the tube is inserted to a point that moves the valve out of engagement with the cylindrical valve seat, whereby the tube will be sealed to the fitting body before the valve opens.

The tube support portion and valve portion preferably are formed as a single piece, and the valve plunger is resiliently biased toward its closed position. The fitting body can include a stop limiting the extent of travel of the valve plunger in the insertion direction of the tube, and the valve plunger can be resiliently biased by a spring interposed between the stop and the valve plunger The valve body can have an externally threaded end portion for threaded connection to another component. In an alternative configuration, the valve body can have a cartridge end portion for press-fit insertion into a hole in another component.

In a preferred embodiment, the abutment is formed by an annular shoulder of the valve plunger, which annular shoulder is formed at an intersection of the tube support portion with the valve portion of the valve plunger.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
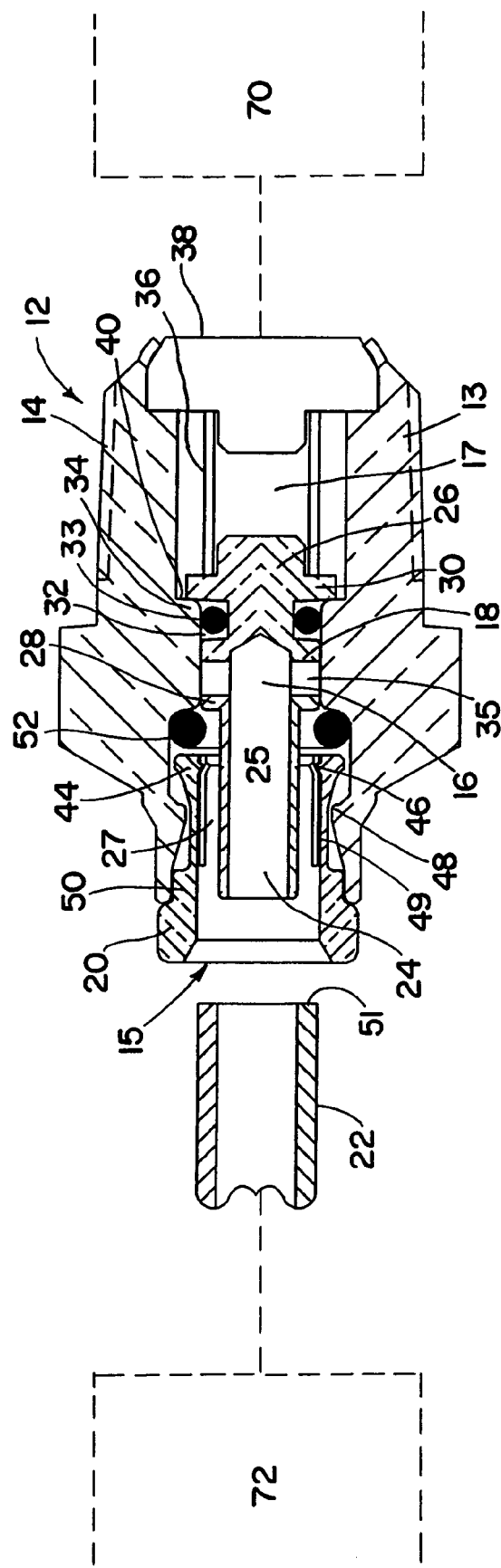
FIG. 1 is a cross-sectional view of a self-sealing tube fitting according to the present invention.

Referring now to the drawings in detail, and initially to FIG. 1, a fitting 12 including a fitting body 13 is shown. Threads 14 may be included on an end of the body 13 for threading the fitting 12 to another component. The fitting body 13 includes a passage 15 extending longitudinally therethrough. The passage 15 includes a throat 16 and a valve chamber 17. The diameter of the valve chamber 17 is larger than the diameter of the throat 16. A valve plunger 18 is supported in the passage 15 and is configured for axial movement along the longitudinal axis of the passage 15. A releasable tube holder 20 is arranged to secure a tube 22 when the tube 22 is inserted into the passage 15 of the fitting 12.

The valve plunger 18 includes a tube support portion 24 on one end and a valve portion 26 on the other end. The tube support portion 24 is generally a. hollow open ended cylindrical support having a diameter generally corresponding to an inner diameter of the tube 22 with which the fitting 12 is used and including a fluid passage 25. The tube support portion 24 and the tube holder 20 define therebetween an annular space 27 into which the tube 22 can be inserted. The valve plunger 18 has an abutment 28 in line with the annular space 27. The abutment 28 is formed by an annular shoulder at the intersection of the tube support portion 24 with the valve portion 26. The annular shoulder generally projects transversely beyond the tube support portion 24.

The valve portion 26 includes a flange 30 and a groove 32 containing a annular seal 33, such as an O-ring or other suitable seal. The annular seal 33 functions as a valve which engages a valve seat 34 formed by a cylindrical interior surface of the body 13 surrounding the throat 16. When the seal 33 is engaged with the valve seat 34, the valve chamber 17 is closed off from the fluid passage 25 in the tube support portion 24. The fluid passage 25 in the tube support 24 communicates with a fluid passage 35 in the valve plunger 18 that opens to an outer surface of the valve plunger 18 at a location between the abutment 28 and the annular seal 33 carried by the valve plunger 18.

A spring 36, or other resilient member, is compressively interposed between the valve plunger 18 and a spring retainer 38. The spring acts upon the flange 30 of the valve 26 thereby resiliently biasing the valve plunger 18 towards its closed position shown in FIG. 1. It will be appreciated that, in the closed position, the spring 36 acts on the valve plunger 18 to cause a flange 30 to rest against a surface 40 of the body 13. The surface 40 is a positive stop against which the flange 30 of the valve 26 is configured to contact thereby preventing further longitudinal movement of the valve plunger 18 into the throat 16.

Figure 2:
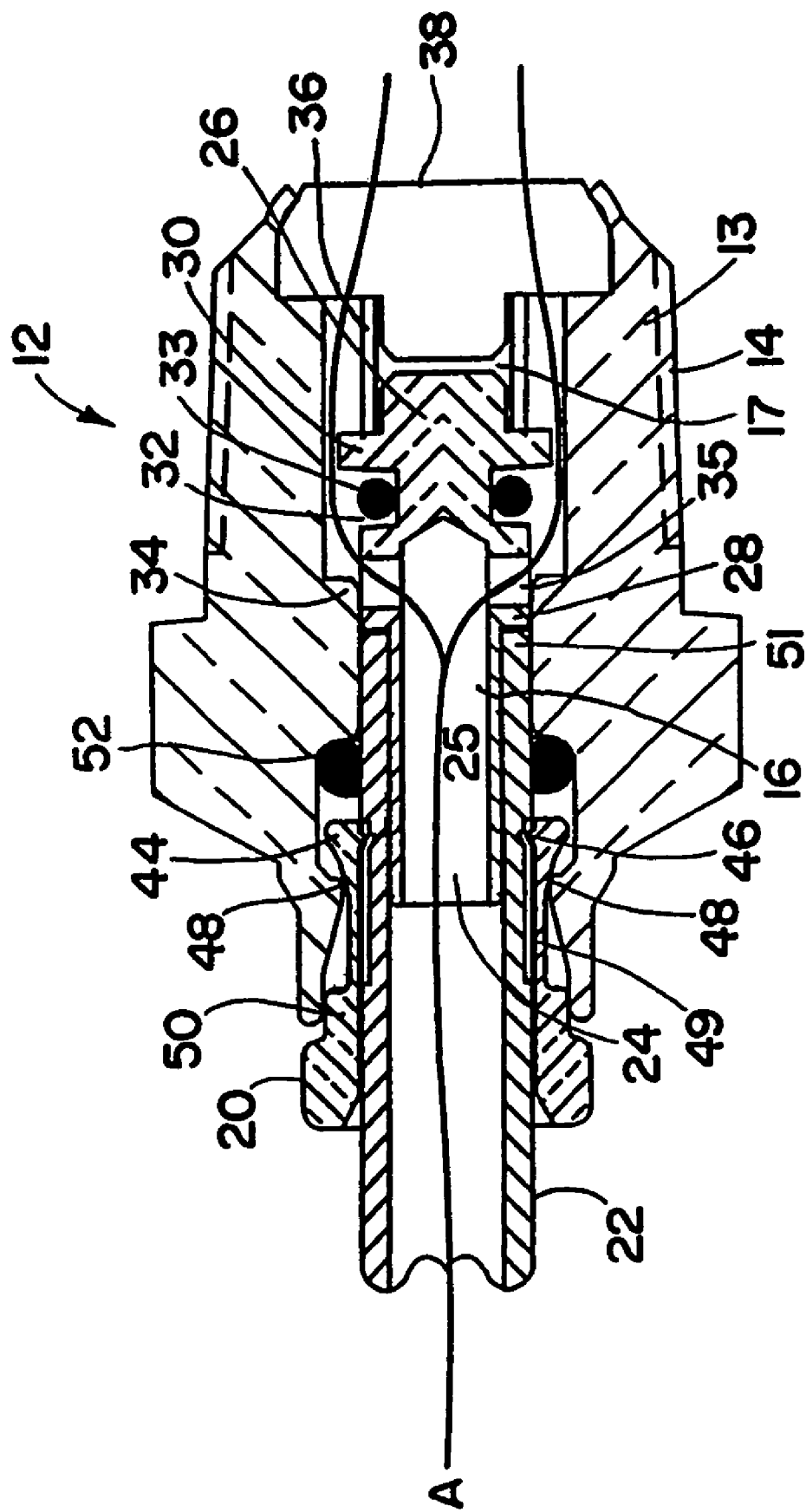
FIG. 2 is a cross-sectional view of the fitting of FIG. 1, showing a tube coupled to the fitting in accordance with the invention.

The releasable tube holder 20, which can be generally annular in shape as shown, is movable axially between a disengaged position shown in FIG. 1 and an engaged position shown in FIG. 2. The tube holder 20, when engaged, grips the tube 22 on an outer surface at a region thereof that is supported interiorly by the tube support portion 24. To effect such gripping, the tube holder 20 includes a gripping portion 44 that is radially inwardly compressed around the tube 22 when the tube holder 20 is urged axially outwardly against a cam on the fitting body 13. In the illustrated embodiment, the gripping portion 44 comprises a plurality of circumferentially spaced apart resilient fingers 49 that extend axially inwardly from an outer annular end portion 50 of the tube holder 20. The fingers 49 have at the ends thereof radially inwardly extending protrusions 46, such as teeth, that are pressed into the tube 22 to lock the tube 22 against pull-out with respect to the tube holder 20. The cam is formed by a ridge 48 on the fitting body 13 that extends radially inwardly and is configured to cooperate with the radially outer sides of the gripping fingers 49 upon movement of the tube holder 20 to the engaged position shown in FIG. 2.

In use, the tube 22 is slid axially over the tube support 24. As the tube 22 is being inserted, an annular seal 52 (e.g., an O-ring) will engage to the exterior surface of the tube 22. Upon further insertion the tube 22 will engage the abutment 28 at which point the valve plunger 18 will be pushed until the valve plunger 18 engages the spring retainer 38, which may function as a stop. As the valve plunger 18 moves toward the stop 38, the valve 26 carried by the valve plunger 18 will move out of engagement with the valve seat 34, at which point the fluid passage 35 begins to open. The valve plunger 18 is in a position such that the valve 26 is primarily within the valve chamber 17. The fluid passage 35 is at least partially within the valve chamber 17 and permits flow through the valve plunger 18 via fluid passage 35 as indicated by the path A.

In the open position, the annular seal 33 is within the valve chamber 17 of the passage 15. In this position, the annular seal 33 is not in contact with the surface of the body 13 and therefore no seal is formed by annular seal 33. The spring 36 is compressed such that it tends to force the valve plunger 18 and valve 26 towards the closed position. As mentioned, the fluid passage 35 is at least partially within the valve chamber 17.

The tube 22 is engaged by the gripping portion 44 of the releasable tube holder 20. A distal end 51 of the tube 22 is in contact with the abutment 28. In this position, the tube holder 24 supports the tube 22 interiorly along the portion of the tube 22 of which the releasable tube holder 20 grips the tube 22.

With reference to FIGS. 1 and 2, the operation of the fitting 12 of the present invention will be described. For the sake of this description, movement of the valve plunger 18 from left to right tends to open the valve 26, and movement of the valve plunger 18 from right to left tends to close the valve 26. In addition, movement of the tube 22 in a direction tending to open the valve 26 is defined as forward movement whereas movement of the tube 22 in a direction tending to close the valve 26 is defined as reverse movement.

Beginning with FIG. 1, a forward force is applied to the tube 22 as the tube 22 is inserted in a forward direction into the passage 15, through the releasable tube holder 20, and telescoped over the tube support 24 until the distal end 51 of the tube 22 contacts the abutment 28. As the tube 22 is inserted and with the tube holder 20 in its disengaged position, the gripping fingers 49 are free to flex radially outwardly to allow for passage of the tube 22. It will be appreciated that seal 52 seals the outer diameter of the tube 22 against the body 13 prior to displacement of the valve plunger 18 by the tube 22.

As the tube 22 continues moving forward into the passage 15, the tube 22 displaces the valve plunger 18 forward. As the valve plunger 18 is displaced forward, the annular seal 33 on the valve 26 is displaced into the valve chamber 17 and the fluid passage 35 is displaced at least partially into the valve chamber 17 thereby opening the valve 26.

It will be appreciated that the spring retainer 38 may also serve as a stop preventing the valve plunger 18 from further forward movement. Once the valve plunger 18 is displaced forward to a position wherein the valve 26 is at least partially open, the tube 22 and valve plunger 18 are permitted to move in a reverse direction. Generally, the reverse force is applied by the spring 36. Pressure in the valve chamber 17 may also be utilized to provide a force to reverse the valve plunger 18 and tube 22. As the tube 22 and valve plunger 18 begin reverse movement, the releasable tube holder 20 begins to engage the outside diameter of the tube 22 due to the orientation of the protrusions 46 with respect to the outside diameter of the tube 22.

As shown in FIG. 2, the releasable tube holder 20 is displaced slightly in a reverse direction from its position in FIG. 1. As the releasable tube holder 20 is displaced, the gripping portion 44 is urged against the cam surface formed by ridge 48 at which point further reverse movement of the tube 22 is restricted. Thus, as the tube 22 moves from right to left the protrusions 46 are increasingly forced radially inwardly against the outside diameter of the tube 22 by the cam surface formed by ridge 48. The tube support 24 supports the tube 22 along its inside diameter against the compressive force of the releasable tube holder 20 thereby allowing the releasable tube holder 20 to firmly engage the tube 22.

It will be appreciated that the tube support 24 reduces or prevents crushing and/or deformation of the tube 22 when the releasable tube holder 20 engages the tube 22. Any crushing or deformation of the tube 22 would not only reduce the holding strength of the releasable tube holder 20 but also tend to decrease the effectiveness of the seal 52 on the outside diameter of the tube 22 by creating a less uniform outside diameter of the tube 22 against which the seal 52 may act.

Further, the more secure engagement of the tube 22 by the releasable tube holder 20 prevents the tube 22 from being pulled from the fitting 12 during operation. The more secure engagement may also facilitate higher tube 22 operating pressures by preventing the tube 22 from being "blown" off the fitting 12 during use.

It will also be appreciated that the tube support 24 may allow the use of more flexible tubing and/or connection of tubes to the fitting under higher pressures by providing support to enhance the structural rigidity of the tube 22. For example, as the pressure in the valve chamber 17 increases, a greater force is required to displace the valve plunger 18 from the closed position to the open position. The greater the force required to displace the valve plunger 18 the more likely the tube 22 is to buckle as an external force is applied to the tube 22 to displace the valve plunger 18. However, the tube support 24 may tend to provide internal support to the tube 22 to resist buckling. Thus, a greater force may be applied to the tube 22 which in turn allows a greater pressure to be overcome when displacing the valve plunger 18. Similarly, because the tube support 24 may provide resistance to buckling, a more flexible tube 22 may be suitable for use than in a similar fitting without a tube support 24.

With reference to FIG. 2, the tube 22 may be removed from the fitting 12 by returning the releasable tube holder 20 to a forward position as shown in FIG. 1, and removing the tube 22 from the passage 15 while maintaining the releasable tube holder 20 in the forward position. This may be accomplished by applying a forward force to the releasable tube holder 20 to displace and maintain the releasable tube holder 20 in the forward position. When the releasable tube holder 20 is in the forward position, the protrusions 46 and finger 49 can flex radially outward and are no longer compressively engaged with the outer diameter of the tube 22. Thus, in the forward position the tube holder 20 does not restrict movement of the tube 22 in the forward or reverse direction. It will be appreciated that as the tube 22 is reversed, the spring 36 returns the valve plunger 18 to the position of FIG. 1 thereby closing the valve 26 and sealing the passage 15.

It will be further appreciated that during insertion of the tube 22 into the fitting 12, the seal 52 seals the tube 22 to the body 13 and/or tube support 24 prior to the valve 26 opening, thereby preventing leakage from the fitting 12 during insertion of the tube 22. Similarly, upon removal of the tube 22 from the fitting 12, the seal 52 maintains the seal between the tube 22 and the body 13 and/or tube support 24 until the valve 26 is closed thereby preventing leakage from the fitting 12 during removal of the tube 22.

Figure 3:
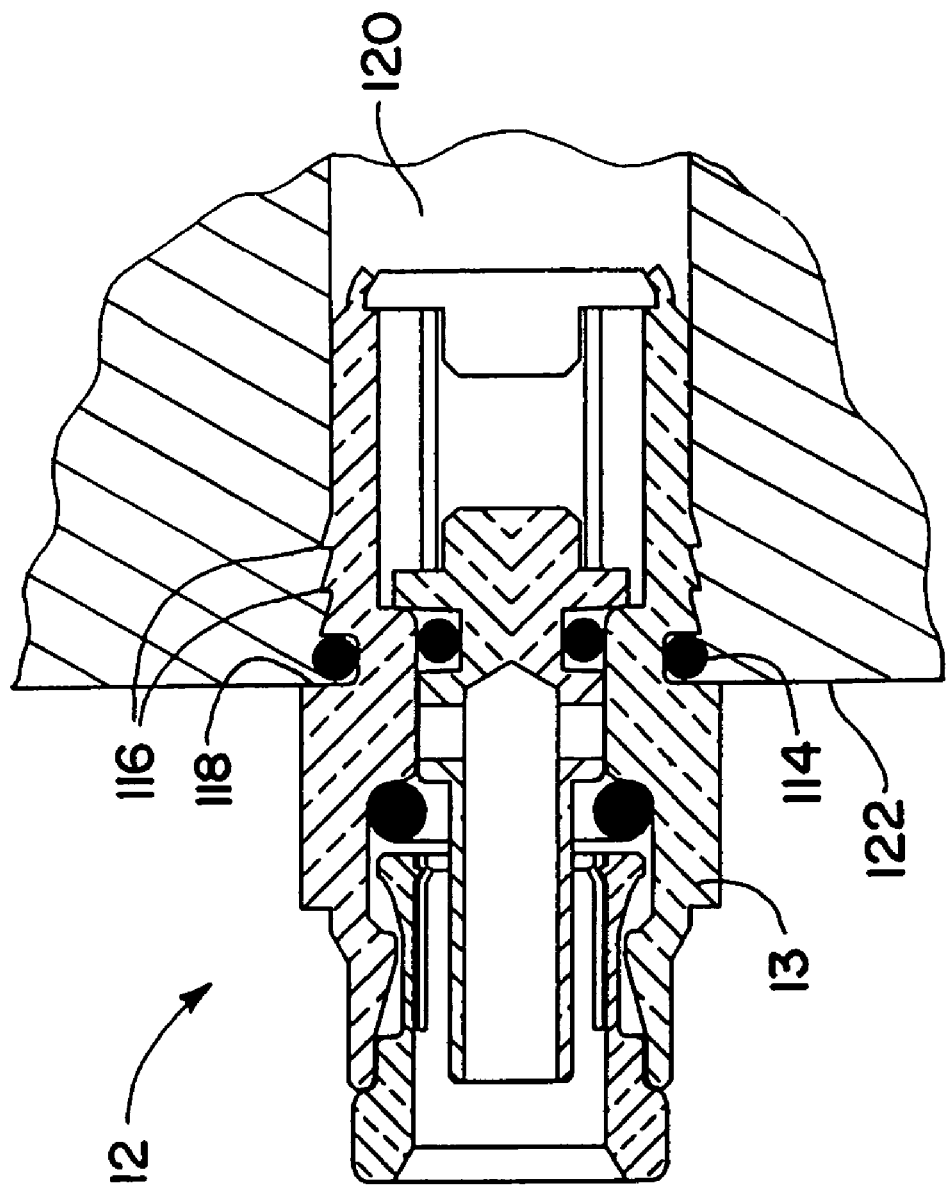
FIG. 3 is a cross-sectional view of another self-sealing tube fitting according to the present invention.

Turning now to FIG. 3, another fitting 12 according to the present invention will be described. In this embodiment the fitting 12 is insertable into a cavity 120. The fitting 12 in this embodiment is identical to the fitting of FIGS. 1 and 2 in every way except that the fitting body 13 includes a seal 114 and barbs 116 on an outside diameter. Thus, the fitting 12 is generally configured to be inserted into the cavity 120 such that the surface 118 of the fitting 12 contacts a perimeter surface of the cavity 122. The seal 114 seals an inside diameter of the cavity to the fitting 12, while barbs 116 prevent the fitting 12 from removal from the cavity 120. Such fittings may be commonly known as cartridges.

The fitting 12 is easily installed by pressing it into the cavity 120 and provides a releasable yet secure connection between the cavity 122 and the cavity 122 when tube 22 is inserted into the fitting 12 as described above.

One exemplary application of a fitting 12 of the present invention is use of the fitting 12 in air and/or cooling lines of a mold, thereby to facilitate mold change. Returning to FIG. 1, a fluid supply 70 and a mold 72, shown in phantom, are connected via a supply line, tube 22. The tube 22 includes a fitting 12 of the present invention. The fitting 12 provides a detachable yet secure connection between the tube 22 and fitting 12, while enabling the quick connection and quick disconnection of the tube 22 to the fitting 12 even when the fitting 12 is under pressure.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A self-sealing tube fitting comprising:
   a fitting body;
   a valve plunger supported in the fitting body for axial movement between open and closed positions, the plunger having a valve portion and tube support portion extending axially from the valve portion, the valve portion having a portion thereof projecting transversely beyond the tube support portion to form an abutment; and
   a releasable tube holder movable between an engaged position and a disengaged position, the tube holder surrounding the tube support portion and defining therewith an annular space into which a tube can be inserted and telescoped over the tube support portion for engaging the abutment such that further insertion of the tube into the fitting body effects movement of the plunger from its closed position to its open position;
   wherein the releasable tube holder, when engaged, grips the tube on an outer surface at a region thereof that is axially coextensive with the tube support portion whereby the tube will be supported interiorly by the tube support portion radially inwardly of the location that the tube holder grips the tube.

2. A self-sealing tube fitting as set forth in claim 1, wherein the valve portion includes a valve and the fitting body includes a valve seat that is engaged by the valve to close a fluid passage in the fitting body, the valve engaging the valve seat to close the fluid passage when the valve plunger is in its closed position and the valve being spaced from the valve seat to open the fluid passage when the valve plunger is in its open position.

3. A self-sealing tube fitting as set forth in claim 2, wherein the valve seat has an inner cylindrical surface.

4. A self-sealing tube fitting as set forth in claim 3, further comprising a first annular seal in the fitting body, the first annular seal being configured to seal against the outside surface of the tube when inserted into the fitting body.

5. A self-sealing tube fitting as set forth in claim 4, wherein the first annular seal is positioned to seal against the outer surface of the tube before the tube is inserted to a point that moves the valve out of engagement with the cylindrical valve seat, whereby the tube will be sealed to the fitting body before the valve opens.

6. A self-sealing tube fitting as set forth in claim 5, wherein the tube support portion has a fluid passage communicating with the fluid passage in the fitting body when the valve plunger is in its open position.

7. A self-sealing tube fitting as set forth in claim 6, wherein the valve includes a second annular seal carried by the plunger for movement therewith.

8. A self-sealing tube fitting as set forth in claim 7, wherein the fluid passage in the tube support communicates with a fluid passage in the valve plunger that opens to an outer surface of the valve plunger at a location between the abutment and the second annular seal carried by the plunger.

9. A self-sealing tube fitting as set forth in claim 8, wherein the tube support portion and valve portion are formed as a single piece.

10. A self-sealing tube fitting as set forth in claim 1, wherein the valve plunger is resiliently biased toward its closed position.

11. A self-sealing tube fitting as set forth in claim 10, wherein the fitting body includes a stop limiting the extent of travel of the valve plunger in the insertion direction of the tube.

12. A self-sealing tube fitting as set forth in claim 11, wherein the valve plunger is resiliently biased by a spring interposed between the stop and the valve plunger.

13. A self-sealing tube fitting as set forth in claim 1, wherein the fitting body has an externally threaded end portion for threaded connection to another component.

14. A self-sealing tube fitting as set forth in claim 1, wherein the fitting body has a cartridge end portion for press-fit insertion into a hole in another component.

15. A self-sealing tube fitting as set forth in claim 1, wherein the abutment is formed by an annular shoulder of the valve plunger.

16. A self-sealing tube fitting as set forth in claim 15, wherein the annular shoulder is formed at an intersection of the tube support portion with the valve portion of the valve plunger.

17. A molding machine comprising:
a fluid supply;
a mold; and
a fitting as set forth in claim 1 in a supply line connecting the supply to the mold.

18. A self-sealing tube fitting comprising:
a fitting body;
a valve plunger supported in the fitting body for axial movement between open and closed positions, the plunger having a valve portion and tube support portion extending axially from the valve portion, the valve portion having a portion thereof projecting transversely beyond the tube support portion to form an abutment;
a releasable tube holder movable between an engaged position and a disengaged position, the tube holder surrounding the tube support portion and defining therewith an annular space into which a tube can be inserted and telescoped over the tube support portion for engaging the abutment such that further insertion of the tube into the fitting body effects movement of the plunger from its closed position to its open position;
wherein the releasable tube holder, when engaged, grips the tube on an outer surface at a region thereof that is axially coextensive with the tube support portion whereby the tube will be supported interiorly by the tube support portion radially inwardly of the location that the tube holder grips the tube;
and a flexible tube inserted into and engaged by the fitting.

* * * * *